May 25, 1937.  L. W. BLAU  2,081,350

METHOD AND APPARATUS FOR ELIMINATING LOW FREQUENCIES

Filed March 6, 1933

Ludwig W. Blau Inventor

W. E. Currie Attorney

Patented May 25, 1937

2,081,350

UNITED STATES PATENT OFFICE 2,081,350

METHOD AND APPARATUS FOR ELIMINATING LOW FREQUENCIES

Ludwig W. Blau, Houston, Tex., assignor to Standard Oil Development Company, a corporation of Delaware Application March 6, 1933, Serial No. 659,822

16 Claims. (Cl. 177—352)

This invention relates to improvements in eliminating low frequencies from electric circuits. More particularly it relates to an improved method and apparatus for eliminating low frequency waves in reflection seismology.

In seismic prospecting by reflections it is customary to explode a charge of explosives at any desirable depth and to place a number of detectors at suitable distances from the shot point. The detectors are generally placed in a straight line with respect to the shot point and at approximately equal distances from each other, although other arrangements are sometimes employed.

A difficulty in reflection seismology arises from the fact that the surface waves have low frequencies and large amplitudes. These waves travel with a smaller velocity than direct longitudinal waves and hence the surface waves arrive at about the same time as the reflected longitudinal waves. The low frequency and more particularly the large amplitude of the surface waves are detrimental to the appearance of reflection records and obliterate the reflection's identity. The reflected waves have little energy and a record of the reflected wave is generally marred by the low frequency, large amplitude, surface waves.

It is an object of this invention to eliminate the objectionable waves, thereby rendering possible the identification of reflections. Other objects will be apparent from the specification and from the accompanying drawing in which latter—

Figure 1:
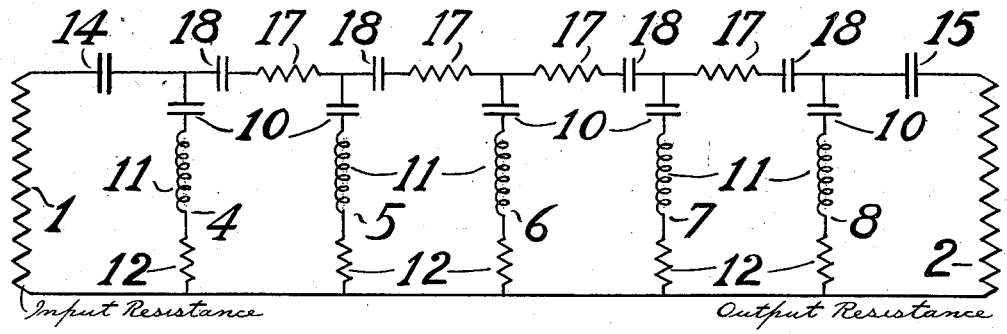
Fig. 1 is a diagrammatic representation of a preferred form of circuit.

Referring particularly to Fig. 1, reference numeral 1 designates an input resistance such as the resistance of an electrical seismograph and numeral 2 represents an output resistance. An electric circuit connects the resistances. A plurality of parallel branches 4, 5, 6, 7 and 8 are provided in the circuit. Each branch includes a condenser 10 together with an inductance 11 and resistance 12 of a choke coil. A condenser 14 is provided in the circuit between the resistance 1 and the branch 4 and a condenser 15 is provided in the circuit between the branch 8 and the output resistance 2. A damping resistance 17 and a condenser 18 are connected in series in the circuit between each of the adjoining branches 4, 5, 6, 7 and 8.

The elimination of low frequencies is accomplished as follows: Such values of the inductance 11 and condenser 10 of branch 4 are selected that the combination resonates at three cycles. Similarly the corresponding combinations of branches 5, 6, 7 and 8 are so adjusted that they resonate at six, nine, twelve and fifteen cycles, respectively. The vector voltages across the condenser and inductance of each branch are out of phase and cancel out at resonance when the condenser is connected in series with the inductance. Therefore the voltage drop across the combination of condenser 10, inductance 11 and resistance 12 of branch 4 is very small at three cycles and would be zero if a coil having zero D. C. resistance could be made. The voltage drop across the condenser 14, the capacity of which is of the order of 0.1 microfarad is very large at three cycles. Consequently a frequency of three cycles is substantially eliminated by the combination of condenser 14, together with the condenser 10, inductance 11 and resistance 12 of branch 4 since only the drop across the condenser 10, inductance 11 and resistance 12 is impressed upon the next section of the filter.

By way of example, the condenser 14 may have a capacity of 0.1 microfarad. The condenser 10 may have a capacity of four microfarads, the inductance 11 may be 625 henries while the resistance 12 of the choke coil may be eight thousand ohms. At three cycles, therefore, the drop across the branch 4 is $$\frac{8000}{535,000}$$

approximately, of the drop across the input resistance 1.

The combination of condenser 10 and inductance 11 of branch 5 tunes at six cycles; hence at this frequency the drops across condenser 10 and inductance 11 of branch 5 cancel, leaving only the drop across the resistance 12 of branch 5, so that at six cycles there can again be eliminated all but one or two parts per thousand of the energy and but little energy of frequency four or five will be passed. The branches 6, 7, and 8 function in a similar manner to that described for branches 4 and 5.

The circuit between the input resistance 1 and the output resistance 2 forms an oscillatory system which would resonate without the damping resistances 17 at such a frequency as to interfere with the recording of reflections. The origin of the frequency being in the circuit and not coming from the ground would cause the seismogram to be distorted. Such oscillations may be sustained for example for as long as 0.1 second. It frequently happens that two reflections arrive within 0.02 second of each other. It is evident therefore that the oscillations in the apparatus must be damped to a shorter time than 0.02 second. The damping resistances 17 function to damp the circuit as much as desired. Preferably critical damping or overdamping of all circuits is effected.

The values of the input resistance 1, the output resistance 2 and the condensers 14, 18 and 15 are preferably so chosen that they will reduce the vibrations of frequencies greater than twenty cycles very little. Preferably the capacities of the condensers 18 are made equal to each other and the capacities of condensers 14 and 15 are made approximately twice as large as the capacities of the condensers 18. Alternatively the capacities of these condensers can be varied and some of the advantages of the invention will be retained. Also the branches 4, 5, 6, 7 and 8 can be timed at progressively decreasing cycles. For example, branch 4 can be timed at fifteen cycles and branch 5 at twelve cycles, etc. and some of the advantages of the invention will be retained.

Since the low frequencies have greater energies it is desirable to eliminate them first. Where the low frequencies are weak, a lesser number of branches may be necessary as, for example, only one branch may be needed to eliminate the low frequencies. When the low frequencies are exceptionally strong it may be necessary to add additional branches to the circuit. The circuit is adjusted to eliminate all frequencies lower than fifteen and to weaken those frequencies less than twenty. All higher frequencies are left unimpaired.

Figure 2:
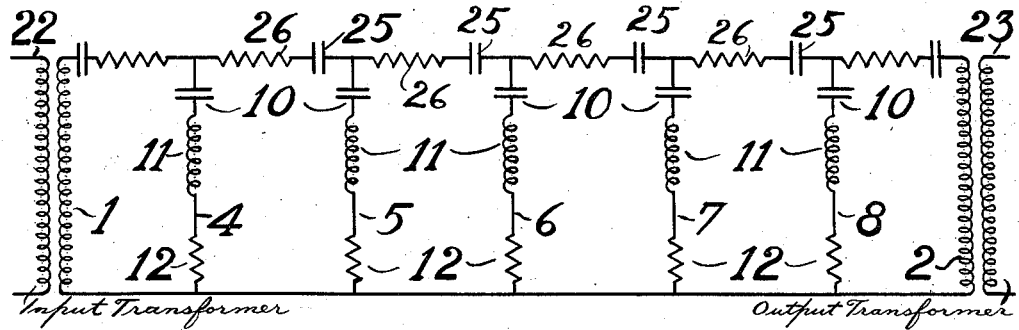
Fig. 2 is a diagrammatic representation of a modified form of circuit.

Fig. 2 shows a variation in the circuit illustrated in Fig. 1 and like parts are indicated by like reference numerals. In this circuit reference numeral 22 designates an input transformer and 23 designates an output transformer. The branches 4, 5, 6, 7 and 8 are connected in parallel across the circuit. Condensers 25 and damping resistances 26 are connected in series with the circuit between each of adjoining branches 4, 5, 6, 7 and 8 and between the input transformer 22 and the branch 4 as well as between the branch 8 and the output transformer 23.

Figure 3:
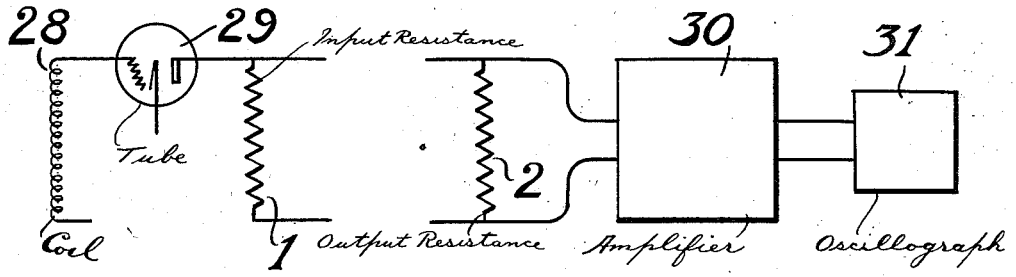
Fig. 3 is a diagrammatic representation of an arrangement of aparatus for reflection shooting.

Referring particularly to Fig. 3, a preferred arrangement of apparatus for reflection shooting is shown in which reference numeral 28 designates the coil of a magneto-electrical seismograph such as is described in the co-pending application Ser. No. 626,132 of Ludwig W. Blau et al., entitled "Seismograph", filed July 29, 1932, and the magneto-electrical seismograph described in the patent of Ludwig W. Blau et al., No. 2,018,756. Alternatively other electrical seismographs such as a single condenser, double condenser, hot-wire, piezo electric, or any other electric seismographs can be used.

The coil 28 is connected across the grid and filament of a vacuum tube 29 which may be a three-electrode or a screen grid tube. The vacuum tube 29 is connected to the input resistance 1 of the circuit previously described in connection with Fig. 1. The output resistance 2 of the circuit is connected to a vacuum tube amplifier 30 which in turn is connected to an oscillograph 31, which records the seismogram. Preferably the filter circuit is connected ahead of the amplifier 30 so that the objectionable low frequencies can be eliminated before being amplified. Putting the filter circuit after the amplifier would result in overloading the amplifier tubes. However, the filter circuit can be connected anywhere between the seismograph and the oscillograph and some of the advantages of the invention will be retained.

In using the circuit illustrated in Fig. 2 the transformers 22 and 23 are connected in place of the resistances 1 and 2 respectively of Fig. 3. Alternatively the circuit illustrated in Fig. 2 can be connected anywhere between the seismograph and the oscillograph and some of the advantages of the invention will be retained.

Each filter circuit shown in Figs. 2 and 3 can be used with an input transformer and an output resistance or with an input resistance and an output transformer.

By the construction described those frequencies which are very low, inaudible, and carry much more energy than the relatively higher frequencies, are eliminated. Such low frequencies are often one hundred or even one thousand times as strong as the relatively higher frequencies which are retained.

The filtering operation is effected in successive stages. Each oscillating circuit is damped to eliminate those frequencies which have their origin in the circuit. All frequencies lower than approximately fifteen cycles are eliminated.

Various changes and alternative arrangements may be made within the scope of the appended claims, in which it is my intention to claim all novelty inherent in the art as broadly as the prior art permits.

I claim:

1. A filter for eliminating low frequency waves, comprising an electric circuit, a plurality of parallel branches for the circuit each having a condenser, an inductance, and a resistance connected in series, each branch tuned to different frequencies, and a damping resistance in the circuit between adjoining branches.

2. A filter for eliminating low frequency waves, comprising an electric circuit having a plurality of parallel branches each with a condenser, an inductance and a resistance connected in series, each branch tuned to different frequencies, and a damping resistance and a condenser connected in series in the circuit between adjoining branches.

3. A filter for eliminating low frequency waves, comprising an electric circuit, a plurality of parallel branches for the circuit each having a condenser, an inductance and a resistance connected in series, the branches being tuned to resonate at approximately 3, 6, 9, 12 and 15 cycles successively, and a damping resistance in the circuit between adjoining branches.

4. A filter for eliminating low frequency waves, comprising an electric circuit, a plurality of parallel branches for the circuit each having a condenser, an inductance and a resistance connected in series, each branch tuned to different low frequencies, a damping resistance and a condenser connected in series in the circuit between adjoining branches, and a condenser at the input and output ends of the circuit.

5. A filter for eliminating low frequency waves, comprising the inductance coil of a seismograph connected through the grid and filament of a vacuum tube with an electric circuit, one end of which is connected to the plate resistor of the vacuum tube, the electric circuit having a plurality of parallel branches, each with a condenser, an inductance and a resistance connected in series, each branch tuned to different low frequencies, a damping resistance connected in series in the circuit between adjoining branches, a vacuum tube amplifier connected to the other end of the electric circuit, and an oscillograph connected to the amplifier.

6. A filter for eliminating low frequency waves, comprising the inductance coil of a seismograph connected across the grid and filament of a vacuum tube, an electric circuit, one end of which is connected to the plate resistor of the vacuum tube, the electric circuit having a plurality of parallel branches, each with a condenser, an inductance and a resistance connected in series, each branch tuned to different low frequencies, a damping resistance and a condenser connected in series in the circuit between adjoining branches, a vacuum tube amplifier connected to the other end of the circuit, and an oscillograph connected to the amplifier.

7. A filter for eliminating low frequency waves, comprising, an electric circuit, a plurality of parallel branches in the circuit, each having a condenser, an inductance and a resistance connected in series, the branches being tuned to resonate at approximately 3, 6, 9, 12 and 15 cycles successively, and a damping resistance and a condenser in the circuit between adjoining branches.

8. A filter for eliminating low frequency waves, comprising, an electric circuit, a plurality of parallel branches in the circuit, each having a condenser, an inductance and a resistance connected in series, each branch tuned to different low frequencies, a damping resistance connected in series in the circuit between adjoining branches, and a condenser at the input and output ends of the circuit.

9. A filter for eliminating low frequency waves, comprising, an electric circuit, a plurality of parallel branches in the circuit, each having a condenser, an inductance and a resistance connected in series, each branch tuned to different frequencies, and a condenser and a resistance at the input and output ends of the circuit and between their adjoining branches.

10. Apparatus for filtering out low wave frequencies from an electric circuit, which comprises means for passing the waves through successive filtering stages, means for filtering out substantially all low frequency waves of different wave lengths at each stage, and means for damping any oscillations at each stage.

11. Apparatus for filtering low frequency waves from an electric circuit, which comprises means for passing the waves through successive filtering stages, means for filtering out substantially all low frequency waves of successively greater wave lengths at each stage, and means for damping any oscillations at each stage.

12. Apparatus for filtering out low frequency waves from an electric circuit, which comprises means for passing the waves through successive filtering stages, means for filtering out substantially all low frequency waves of different wave lengths at each stage until all waves lower than approximately 15 cycles have been eliminated, and means for damping any oscillations at each stage.

13. Apparatus for filtering low frequency waves from an electric circuit, which comprises an electric circuit constituting an oscillatory system adapted to resonate which receives the waves, means in the circuit for filtering out the low frequency waves, and means for damping out any oscillations originating in the circuit.

14. Apparatus for transmitting low frequency waves, which comprises means for stepping up the voltage of the waves, an electric circuit constituting an oscillatory system adapted to resonate connected to receive the thus treated waves, and means for damping out any oscillations originating in the circuit.

15. Apparatus for recording high frequency electrical pulsations due to reflected elastic earth waves, which comprises means for transforming elastic earth waves of varying frequency into electrical pulsations, means for eliminating undesirable low frequencies due to waves other than reflected waves, means for damping the oscillations originating during the transforming and eliminating steps, means for amplifying the desirable high frequencies due to the reflected waves, and means for recording the amplified high frequencies.

16. In seismic prospecting in which earth vibrations of varying frequencies are produced, apparatus for recording the relatively high frequency earth waves, which comprises means for transforming the earth vibrations into their corresponding pulsations of electric energy of mixed high and low frequency, means for passing the pulsations through successive stages of an electric system constituting an oscillatory system adapted to resonate, means for filtering out low frequency pulsations of different wave lengths at each stage, means for damping out any oscillations generated in the system, means for passing the high frequency pulsations through the system, and means for recording the high frequency pulsations.

LUDWIG W. BLAU.